UNITED STATES PATENT OFFICE.

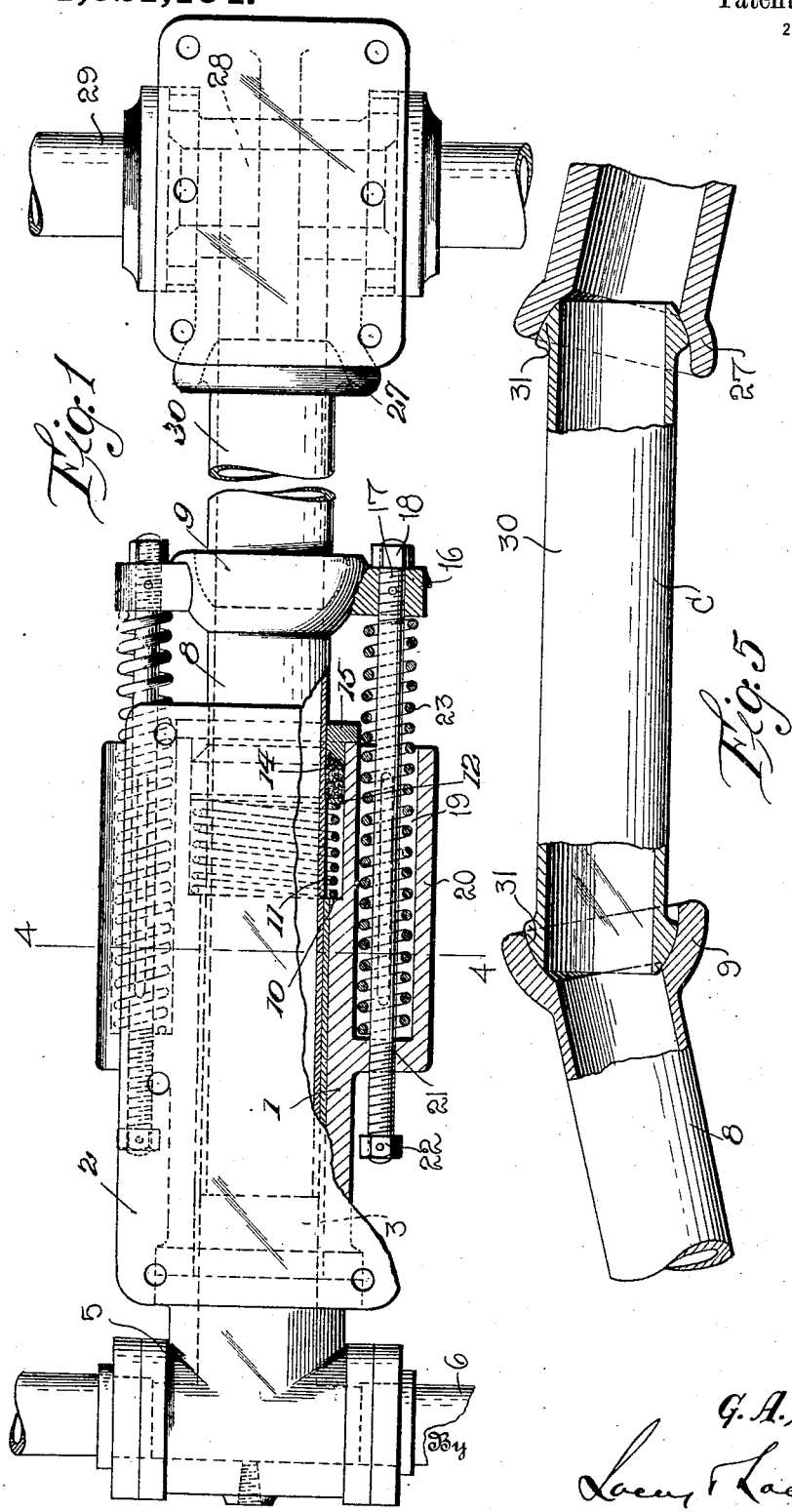

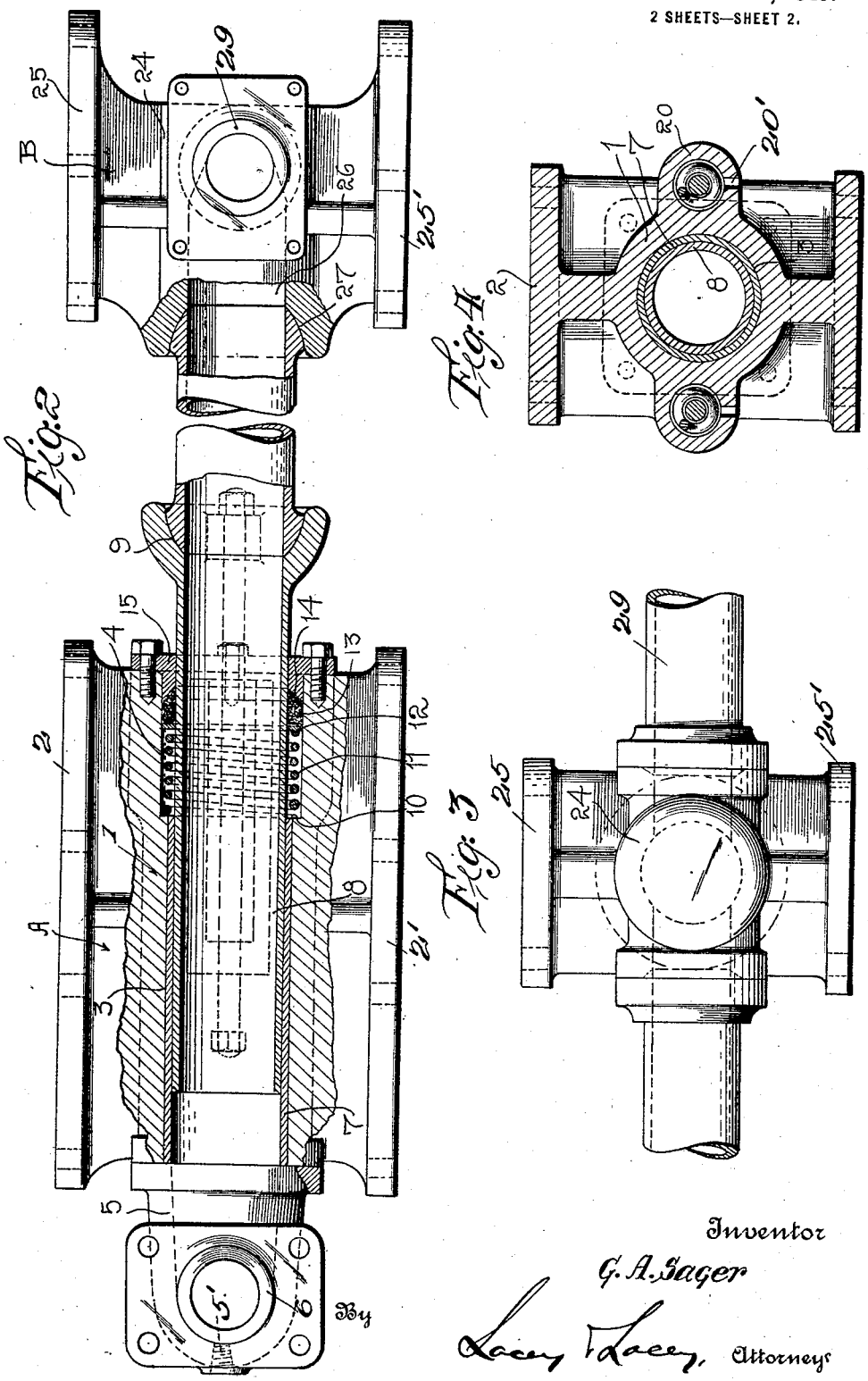

GEORGE A. SAGER, OF ALBANY, NEW YORK.

TRAIN-PIPE COUPLING.

1,321,154.  Specification of Letters Patent.  Patented Nov. 11, 1919.

Application filed October 22, 1918. Serial No. 259,212.

*To all whom it may concern:*

Be it known that I, GEORGE A. SAGER, a citizen of the United States, residing at Albany, in the county of Albany and State of New York, have invented certain new and useful Improvements in Train-Pipe Couplings, of which the following is a specification.

This invention relates to train pipe couplings and more particularly to a coupling designed for employment between a locomotive and its tender for conducting water from the tender to the injector for the locomotive boiler, and it is one object of the invention to provide a coupling which will possess the desired degree of flexibility so that its functions will not be interfered with because of any relative movement of the locomotive and tender, and yet the coupling will be entirely water-tight so as to provide against leakage.

Another object of the invention is to provide a coupling for the purpose stated so constructed that while devoid of flexible pipe connections, it will not become disarranged, nor will its functions be in any way impaired because of yielding of the draw bar connections between the locomotive and its tender under running conditions.

A further object of the invention is to provide a coupling embodying two members or sections designed one for attachment to the locomotive and the other for attachment to the tender, and a third section which establishes communication between the first-mentioned members or sections, and which is bodily removable from between the sections upon uncoupling of the locomotive and tender, when occasion arises and which will be firmly held in place when the locomotive and tender are coupled together, and this without the employment of any bolts or other securing devices or any automatic locking means such as ordinarily employed.

In the accompanying drawings:

Figure 1 is a top plan view, parts being shown in horizontal section, illustrating the coupling embodying the present invention;

Fig. 2 is a vertical longitudinal sectional view through the coupling;

Fig. 3 is a rear elevation of that member of the coupling which is to be mounted upon the locomotive tender;

Fig. 4 is a vertical transverse sectional view on the line 4—4 of Fig. 1;

Fig. 5 is a horizontal sectional view illustrating the positions which the parts will assume when the locomotive and tender are rounding a curve.

As before stated, the coupling embodying the present invention includes a coupling head which is to be mounted upon the locomotive, a coupling head which is to be mounted upon the tender, and a coupling pipe section which is to be disposed between the said heads and establishes communication therebetween. The locomotive coupling head, indicated in general by the reference letter A, includes a body 1 which is provided at its upper side with an attaching base portion 2 designed to be bolted to the under side of the rear sill of the locomotive and thus rigidly secured in place. The body 1 of the coupling head A is formed with a cylindrical bore indicated by the numeral 3, this bore opening through the rear side of the head and being increased in diameter at its rear end as indicated by the numeral 4 and for a purpose to be presently pointed out. At its forward end, the bore 3 communicates with one branch of a T 5 from the other branches of which T lead pipes 6 which serve to conduct the water supplied from the tender, to the right and left hand injectors for the locomotive boiler. A bushing 7 preferably of bronze is fitted within the bore 3, and telescopically fitted within this bushing is a pipe section 8 which at its rear end extends beyond the rear side of the coupling head A and is provided with a ball socket 9. Although the pipe section 8 is, as stated, slidably fitted within the bushing 7, leakage is provided against by means which will now be described. The formation of the enlarged portion 4 of the bore 3 results in a shoulder 10 against which bears one end of a compression spring 11 which is fitted within the said enlarged portion of the bore, this spring surrounding the pipe section 8 and bearing at its other or rear end against a ring 12 which likewise surrounds the said pipe section 8 and is located within the enlargement of the bore. The ring 12 bears against a mass of soft packing 13 disposed about the pipe section 8 within the enlargement 4 and compresses this packing against the beveled inner face 14 of a cap 15 which is bolted or otherwise secured to the rear side of the coupling head A and closes the enlarged end of the bore 3. The pressure of the spring 11 against the ring 12 will, as stated, compress the packing 13 and thus close the same in a water-tight manner about the pipe 8 and against the wall of the enlargement 4 of the bore 3.

The pipe section 8 is to be held projected rearwardly through a yieldable means which will now be described. The socket 9 at the rear end of the pipe section 8 is formed at its diametrically opposite sides with laterally projecting lugs 16 into which are threaded the forward ends of rods 17, jam or lock nuts 18 being threaded onto the rear extremities of these rods whereby to securely anchor the rods in place. The rods extend forwardly from the lugs beside the body of the coupling head A and axially within the bores 19 of sleeve sockets 20 which are preferably integral with the exterior of the said body 1. These sockets are open at their rear ends and closed at their forward ends except for openings 21 through which the forward end portions of the rods 17 are slidably fitted, the rods being provided upon their forward ends with nuts or other abutment elements indicated by the numeral 22 and which elements are designed to abut against the said closed forward ends of the respective sleeve sockets 20 to limit the rearward movement of the pipe section 8. Such movement of the pipe section is influenced by springs 23 which are of the compression type and are fitted to the rods 17 and bear at their rear ends against the respective lugs 16 and at their rear portions extend into the bores 19 of the sleeve sockets 20 and bear against the inner or forward ends of the bores. These springs, of course, exert a pressure in a rearward direction against the lugs 16 to yieldably hold the pipe section 8 at the limit of its rearward movement, but the pipe section 8 may, of course, slide forwardly in the bushing 7 or, more generally speaking, in the body of the spring head A, against the tension of the said springs 23.

The coupling head which is to be secured to the tender is indicated in general by the reference letter B and the same comprises a body 24 provided with an attaching base 25 designed to be bolted to the under side of the forward sill of the tender. This body 24 has a passage 26 communicating with a ball socket 27 corresponding in contour to the socket 9 and positioned opposite the same when the locomotive and tender are coupled. The body 24 is also formed with branch passages 28 which communicate with the inner end of the passage 26 and from which lead pipes 29 which extend to the right and left hand sides of the tank of the tender.

The intermediate or coupling section of the device, indicated in general by the reference letter C, is in the nature of a pipe 30 of a suitable length exteriorly formed with ball ends 31 of a contour and dimensions to fit within the ball sockets 9 and 27 of the coupling heads A and B in the manner of a ball and socket joint, it being understood, and particularly by reference to Fig. 5 of the drawings, that the coupling heads may have relative angular movement without interfering with the passage of water from the tender through the passage 26, the bore of the pipe 30, and the pipe section 8 of the coupling head A to the locomotive.

In practice the intermediate section C of the coupling will be of a length somewhat greater than the distance between the ball sockets 9 and 27 when the locomotive and its tender are coupled together and consequently when, in the act of coupling the locomotive and its tender, the ball ends 31 of the coupling section C are disposed opposite the ball sockets 9 and 27 and the locomotive is backed to the tender, the said ends of the coupling section C will seat within the ball sockets and the pipe section 8 of the coupling head A will be moved forwardly against the tension of the springs 23. Therefore, these springs 23 will cause the pipe section 8 to exert a longitudinal thrust against the coupling section C holding the ball ends of the said section firmly in the ball sockets of the two coupling heads regardless of any lateral or angular displacement of the locomotive and tender with relation to each other and also regardless of the slight separation of the engine and tender through yielding of the springs of the draft rigging. It will be understood, of course, that the coupling sections C may be made in various lengths so that the coupling as a whole may be adapted for instalment upon various types of locomotives and tenders and in which the distances might vary considerably between the rear sill of the locomotive and the forward sill of the tender, it being only necessary, in such adaptation of the coupling, to employ a coupling section C of the proper length.

As clearly shown in Figs. 1 and 4 of the drawings, each of the sleeves 20 is formed on its under side with a longitudinally extending slot 20′ so that any foreign matter which would otherwise accumulate in these sleeves will be permitted to escape.

In the forward end of the T 5 there is provided a tapped opening 5′ for the connection of a steam nozzle (not shown) for the purpose of preventing freezing of the parts of the coupling in cold weather.

Preferably, the members A and B are provided at their undersides as well as their upper sides with attaching bases indicated respectively by 2′ and 25′ which may serve as supports for other equipment.

It will be observed that the threads of the rods 17 which are engaged by the nuts 22 extend for a considerable portion of the length of the rods so that should it be desired to remove the member 30, these nuts may be turned up upon the rods until they bear against the closed ends of the sleeves 20 and upon further rotation will serve to draw the rods forwardly so as to retract the socket member 9 a sufficient distance to permit of the said removal of the member C.

Having thus described the invention, what is claimed as new is:

1. In a pipe coupling of the class described, a coupling head having a bore, a pipe section slidably fitted in the bore and provided at its outer end with a ball socket to receive the ball head of a coupling section, said coupling head being provided at its opposite sides with tubular guides, rods each connected at one end with the said pipe section, the said rods working in the said guides, springs upon the rods yieldably holding the pipe section in projected position, and adjustable abutment elements upon the other ends of the rods for engagement with the ends of the respective guides to limit the outward movement of the said rods under the influence of the springs, the said guides constituting housings for the spring.

2. In a pipe coupling of the class described, a coupling head having a bore and provided at its opposite sides with tubular guides each open at one end and closed at the other end, a pipe section slidably fitted in the bore and provided with a ball socket to receive the ball end of a coupling section, the said ball socket being provided with bearing portions, rods secured each at one end to the respective bearing portions, the said rods extending into the said guides and slidably fitting through the closed ends of the respective guides, springs upon the rods bearing against the respective bearing portions of the ball socket and extending into the respective guides and bearing against the closed ends thereof, the said rods beyond the closed ends of the guides being threaded, and nuts adjustably fitted onto the threaded portions of the rods and constituting adjustable abutments to contact the said closed ends of the respective guides to limit the outward movement of the rods under the influence of the springs.

3. In a coupling of the class described, a coupling head provided at its upper side with an attaching base adapting it to be secured to an under frame, the said head being provided at its lower side with a head providing for the attachment of other equipment.

4. In a pipe coupling of the class described, a coupling head having a bore, a pipe section slidably telescopically fitted within the bore and having a ball socket, a second coupling head provided with a ball socket, the second head being relatively fixed, a coupling section having ball ends disposed to seat within said sockets, and means associated with the said slidable pipe section yieldably holding the same projected in the direction of the fixed coupling head whereby to exert a longitudinal thrust upon the coupling section to hold its ball ends in engagement in the ball sockets, the said ball ends of the coupling section being freely engaged in the said sockets and non-restrained from separation therefrom whereby when the pipe section is retracted against the projecting means therefor, the said coupling section will be automatically released from engagement in the sockets.

In testimony whereof I affix my signature.

GEORGE A. SAGER. [L. S.]

Copies of this patent may be obtained for five cents each, by addressing the "Commissioner of Patents, Washington, D. C."